United States Patent Office 3,471,486
Patented Oct. 7, 1969

3,471,486
3-ARALKYL-as-TRIAZINES
Donald L. Trepanier, Indianapolis, Ind., assignor to The Dow Chemical Company, Midland, Mich., a corporation of Delaware
No Drawing. Filed Oct. 23, 1967, Ser. No. 677,014
Int. Cl. C07d 55/10; A61k 27/00
U.S. Cl. 260—248
10 Claims

ABSTRACT OF THE DISCLOSURE

Novel 3-(aralkyl)-1,4,5,6-tetrahydro - (substituted)-as-triazines and their hydrohalide salts are prepared by the reaction of an aminoethylhydrazine with substituted acetimidate hydrohalide or a substituted thioacetimidate hydrohalide. The novel compounds are useful as antidepressants as indicated by their antagonism of reserpine and their potentiation of amphetamine.

SUMMARY OF THE INVENTION

This invention relates to novel 3-substituted-as-triazine compounds and is more particularly directed to 3-(aralkyl)-1,4,5,6 - tetrahydro-(substituted)-as-triazines corresponding to the formula

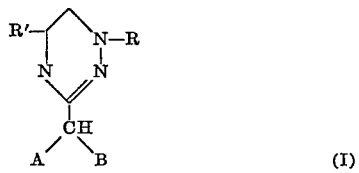

(I)

and the hydrohalide salts thereof. In the present specification and claims, A represents naphthyl or benzyl, B represents hydrogen, methyl, ethyl, phenyl or benzyl and R and R' each independently represent hydrogen or methyl. The term "hydrohalide salt" is understood to include the hydrochloride, hydrobromide and hydroiodide salts of the compounds corresponding to Formula I.

For the sake of convenience, the novel compounds corresponding to Formula I will be referred to hereinafter as "aralkyl triazines."

The novel aralkyl triazine compounds are crystalline solids which are of varying degrees of solubility in organic solvents such as ether, alcohols, chlorinated hydrocarbons, lower alkanes and esters such as ethyl acetate, and which are slightly soluble in water. The hydrochloride, hydrobromide and hydroiodide salts of the aralkyl triazines are crystalline solids which are slightly soluble in benzene and ethers and moderately soluble in water and alcohols.

The aralkyl triazines of the invention have been found to be useful for administration to laboratory animals in study the behaivor thereof and in studying drug effects on the central and peripheral nervous systems. They have been found to be particularly useful as antidepressants as indicated by their antagonism of reserpine-induced depression and their potentiation of d-amphetamine toxicity. The preferred compounds are those corresponding to Formula I wherein B represents hydrogen when A is naphthyl and those wherein B is methyl or phenyl when A is benzyl.

The novel compounds can be prepared by the reaction of an imino ester hydrohalide corresponding to Formula II with a 2-aminoalkylhydrazine corresponding to Formula III:

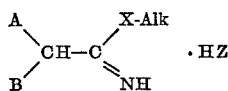

(II)

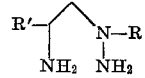

(III)

In Formulae II and III above, A, B, R and R' have the significance set out above with respect to Formula I, X represents oxygen or sulfur, Alk represents methyl or ethyl and HZ represents hydrochloride, hydrobromide or hydroiodide. When X represents sulfur, the preferred imino ester is a methyl thioimino ester hydroiodide corresponding to Formula II, Alk is methyl and HZ is hydroiodide. In all other cases, the preferred imino ester is an ethylimino ester hydrochloride corresponding to Formula II wherein X is oxygen, Alk is ethyl and HZ is hydrochloride. Representative hydrazines which can be employed in the preparation of the compounds of the invention include 1-(2-aminoethyl)hydrazine, 1-(2-aminopropyl)hydrazine, 1 - (2-aminoethyl)-1-methylhydrazine and 1-(2-aminopropyl)-1-methylhydrazine.

The reaction proceeds when the reactants are contacted and mixed in an inert organic solvent as a reaction medium. Representative inert organic solvents which can be employed as reaction media include glacial acetic acid, methanol, ethanol and isopropanol. The reaction proceeds at temperatures from about 25° to about 125° C. and is preferably carried out at the boiling point of the reaction mixture under reflux. When the reaction is carried out in an alcoholic solvent as reaction medium and at low temperatures, it is desirable to add a hydrogen halide acceptor, such as triethylamine, to the reaction mixture. The exact proportion of the reactants to be employed is not critical; however, the imino ester hydrohalide and the 2-aminoalkylhydrazine are consumed in equimolar proportions and the reactants are preferably employed in such proportions. The reaction is generally complete in about 4 to 48 hours depending upon the reaction temperature employed. The product can be separated from the reaction mixture by acidifying the reaction mixture by the addition of aqueous acid followed by extraction to remove by-products such as substituted acetamides and alkyl substituted acetates. An aqueous base such as aqueous sodium hydroxide or aqueous sodium carbonate is then added to make the mixture strongly basic. The product can then be separated by extraction with a halogenated hydrocarbon solvent. The product can be purified by recrystallization from organic solvents such as ethyl acetate, ether, pentane and the like, or it can be converted to a hydrohalide salt.

In a convenient procedure for the preparation of the aralkyl triazines corresponding to Formula I, an imino ester hydrohalide is dissolved in glacial acetic acid, methanol or ethanol and a 2-aminoalkylhydrazine corresponding to Formula III is mixed with the resulting solution. When the reactants are mixed in methanol or ethanol and the reaction is to be carried out at or near room temperature, triethylamine is added to the reaction mixture. In such cases, it is desirable to employ at least one molar proportion of triethylamine for each molar proportion of imino ester hydrohalide, an excess of the triethylamine hydrogen halide acceptor being employed in the preferred procedure. The mixture is then heated at a temperature within the reaction temperature range for from 4 to 48 hours. The mixture is diluted with water and acidified to a pH of about 1 to 2 by the addition of an aqueous acid such as aqueous hydrochloric acid and washed with a chlorinated hydrocarbon solvent such as chloroform. The mixture is then made strongly basic to a pH of about 10 to 12 by the addition of an aqueous base such as aqueous sodium carbonate or aqueous sodium hydroxide. The product is conveniently separated by extraction with a chlorinated hydrocarbon solvent. The product can be obtained from the extract by evaportion and can be purified by conventional procedures such as recrystallization or the product can be converted to a hydrohalide salt.

The hydrohalides of the aralkyl triazines are prepared by dissolving the free base of an aralkyl triazine in a solvent such as methanol, ethanol or ether and thereafter adding an excess of a hydrogen halide such as hydrogen chloride, hydrogen bromide or hydrogen iodide until precipitation of the product is complete. The reaction proceeds at temperatures from 0° to 50° C. and is conveniently carried out at room temperature. The product can be separated by conventional procedures such as evaporation, filtration or centrifugation and purified by conventional procedures such as recrystallization.

The free bases of the aralkyl triazines can be prepared from the hydrohalide salts by dissolving the salt in a minimal amount of methanol and making the solution strongly basic by the addition of an aqueous base such as sodium hydroxide, potassium hydroxide or sodium carbonate. The free base aralkyl triazine can be separated by conventional procedures such as extraction with a chlorinated hydrocarbon solvent. The free base can be purified by conventional procedures such as recrystallization or it can be converted to a hydrohalide salt.

In a convenient procedure for preparing the hydrohalides of the invention, an aralkyl triazine is dissolved in a minimal amount of methanol and an excess of ethereal hydrogen halide is added to the solution. The aralkyl triazine hydrohalide product precipitates in the mixture and can be separated by filtration. The product can be purified by recrystallization from lower alcohols. Alternatively, the product can be treated with aqueous base to prepare free base aralkyl triazine.

DESCRIPTION OF THE PREFERRED EMBODIMENTS

The following examples illustrate the invention but are not to be construed as limiting the same.

Example 1

Ethyl 2,3-diphenylpropionimidate hydrochloride (7 grams; 0.024 mole) was dissolved in 300 milliliters of ethanol and 1-(2-aminoethyl)hydrazine (1.8 grams; 0.025 mole) were added to the resulting solution. The mixture was held at room temperature overnight and then evaportted in vacuo. The residue was mixed with dilute aqueous hydrochloric acid and washed with three separate portions of chloroform, the washings being discharded. The washed mixture was made basic by the addition of cold aqueous 10 normal sodium hydroxide solution and extracted with three portions of chloroform. The chloroform extracts were combined, dried over anhydrous magnesium sulfate, filtered and concentrated by evaporation in vacuo. The concentrated extract was dissolved in a mixture of 300 milliliters of diethyl ether and 1 milliliter of ethanol. Ethereal hydrogen chloride was added to the resulting solution until precipitation was complete, the mixture was filtered and the 3-(1,2-diphenylethyl)-1,4,5,6-tetrahydro-as-triazine hydrochloride filter cake was washed with diethyl ether and dried in vacuo. The dried hydrochloride salt was dissolved in water, aqueous sodium hydroxide solution was added to make the mixture strongly basic and the basic mixture was extracted with diethyl ether. The ether extract was dried over anhydrous magnesium sulfate and evaporated in vacuo. The residue was crystallized from a mixture of diethyl ether and petroleum ether and the 3-(1,2-diphenylethyl)-1,4,5,6-tetrahydro-as-triazine product was found to melt at 107°–108° C. The product was found by analysis to have carbon, hydrogen and nitrogen contents of 77.2, 7.5 and 15.6 percent, respectively, as compared with the theoretical contents of 77.0, 7.2 and 15.7 percent, respectively, calculated for the named structure.

In substantially the same procedure, 3-phenethyl-1,4,5,6-tetrahydro-as-triazine, melting at 114°–115° C., was prepared by the reaction of ethyl 3-phenylpropionimidate hydrochloride and 1-(2-aminoethyl)hydrazine. The product was found to have carbon, hydrogen and nitrogen contents of 69.3, 8.2 and 22.5 percent, respectively, by analysis, as compared with the theoretical contents of 69.8, 8.0 and 22.2 percent, respectively, calculated for the named structure.

Example 2

Methyl 2 - (1 - naphthyl)thioacetimidate hydroiodide (25.8 grams; 0.075 mole) was mixed together with 250 milliliters of glacial acetic acid and 1(2-aminoethyl)hydrazine (5.6 grams; 0.075 mole) was added to the resulting mixture. The mixture was heated to the boiling point under reflux for about 18 hours after which the mixture was cooled and diluted twofold with water. 25 milliliters of concentrated hydrochloric acid were added to the mixture and the mixture was washed with three portions of chloroform, the washings being discarded. The mixture was made basic by mixing with aqueous 10 normal sodium hydroxide solution and the basic mixture was extracted with chloroform. The chloroform extract was dried over anhydrous magnesium sulfate, filtered and concentrated in vacuo. The 3-(1-naphthylmethyl)-1,4,5,6-tetrahydro-as-triazine residue was dissolved in 25 milliliters of methanol, 300 milliliters of diethyl ether were added to the solution and hydrogen bromide gas was mixed with the solution until precipitation was complete. The precipitate was recrystallized from isopropanol and the 3-(1-naphthylmethyl) - 1,4,5,6 - tetrahydro-as-triazine hydrobromide product was found to melt at 249°–250° C. with decomposition. The product was found by analysis to have carbon, hydrogen and nitrogen contents of 55.1, 5.5 and 14.0 percent, respectively, as compared with the theoretical contents of 54.9, 5.3 and 13.7 percent, respectively, calculated for the named structure.

Example 3

Ethyl 3-phenylpropionimidate hydrochloride (38 grams; 0.178 mole) was dissolved in 800 milliliters of ethanol. 1-(2-aminoethyl)-1-methylhydrazine (15.5 grams; 0.174 mole) was added to the solution and the resulting mixture was stirred for 0.5 hour, after which 35 milliliters of triethylamine were added. The resulting mixture was stirred for two days at a temperature of about 25° C. and then evaporated in vacuo. The residue was mixed with dilute aqueous hydrochloric acid and the acidic mixture was washed with three separate portions of chloroform, the washings being discarded. The washed mixture was then made basic by the addition of cold aqueous 10 normal sodium hydroxide solution and extracted with three portions of chloroform. The chloroform extracts were combined, dried over anhydrous magnesium sulfate and concentrated by evaporation in vacuo. The residue was dissolved in a mixture of diethyl ether and ethanol. The resulting solution was treated with gaseous hydrogen chloride until precipitation was complete. The mixture was filtered, the filter cake was dissolved in chloroform and the chloroform solution was evaporated in vacuo. The residue was recrystallized from ethyl acetate and mixed with aqueous 1 normal sodium hydroxide solution. The aqueous mixture was extracted with chloroform and the chloroform extract was dried over anhydrous magnesium sulfate and concentrated by evaporation in vacuo. The residue was dissolved in anhydrous ether and ether solution was treated with gasous hydrogen chloride until precipitation was complete. The 1-methyl-3-phenethyl-1,4,5,6-tetrahydro-as-triazine hydrochloride product was recrystallized twice from a mixture of isopropanol and ligroine and found to melt at 145°–145.5° C. The product was found by analysis to have carbon, hydrogen and nitrogen contents of 59.9, 7.8 and 17.5 percent, respectively, as compared with the theoretical contents of 60.1, 7.6 and 17.5 percent, respectively, calculated for the named structure.

In substantially the same procedure, 3-(2-phenyl-1- methylethyl)-1,4,5,6-tetrahydro-as-triazine hydrochloride, melting at 160°–161° C., was prepared by the reaction of 3-phenyl-2-methylpropionimidate hydrochloride and 1-(2-aminoethyl)hydrazine, and the treatment of the resulting product was an excess of hydrogen chloride. The product was found by analysis to have carbon, hydrogen and nitrogen contents of 60.1, 7.7 and 17.6 percent, respectively, as compared with the theoretical contents of 60.1, 7.6 and 17.5 percent, respectively, calculated for the named structure.

Example 4

Ethyl 2-(1-naphthyl)acetimidate hydrochloride (0.3 mole) was dissolved in 800 milliliters of ethanol and 53.4 grams of 1-(2-aminoethyl)-1-methylhydrazine were added dropwise to the resulting solution. The mixture was held for 1.5 hours at a temperature of 0° C. in an ice bath. 55 milliliters of triethylamine were then added dropwise to the mixture and the resulting mixture was then held at a temperature of 25° C. overnight. The mixture was then evaporated in vacuo and the residue was washed with three 50-milliliter portions of water. The washed residue was then mixed with 50 grams of ice and a mixture of aqueous 10 percent sulfuric acid, ice and water were added to lower the pH of the resulting mixture to approximately pH 2. The acidic solution was extracted twice with methylene chloride and the extracts were discarded. The aqueous mixture was then made strongly basic by mixing it with a mixture of methylene chloride and aqueous 10 normal sodium hydroxide solution. The mixture was extracted with three portions of chloroform and the organic layer and the chloroform extract were combined and dried over anhydrous magnesium sulfate. The dried mixture was evaporated in vacuo and the residue was mixed with diethyl ether and the other solution was filtered. The filtrate was evaporated in vacuo and the residue was recrystallized from a mixture of benzene and hexane. The 1-methyl-3-(1-naphthylmethyl)-1,4,5,6-tetrahydro-as-triazine product was found to melt at 99.5°–100.5° C.

The aralkyl triazines of the invention have central nervous system activity as indicated by their antagonism of reserpine. In representative operations, several separate groups of 10 mice each were administered one of the aralkyl triazines of the invention by intraperitoneal injection. The test compounds were administered at a different dosage rate to each group of mice administered that particular compound. Thirty minutes after the administration of the test compounds, the mice were administered reserpine at a dosage rate of 5 milligrams per kilogram by intraperitoneal injection. The mice were then observed for 45 minutes for symptoms of reserpine-induced depression.

The administration of 5 milligrams per kilogram of reserpine intraperitoneally to mice results in a progression of symptoms beginning with drooping of the eyelids (ptosis) and pilo-erection, culminating in a generalized depression with decreased spontaneous motor activity and decreased responsiveness to auditory and tactile stimuli. Antagonism of reserpine-induced depression is indicated by the absence of the above symptoms and observation of normal spontaneous motor activity and normal responsiveness to auditory or tactile stimuli. The dosage of representative aralkyl triazines of the invention effective to prevent reserpine-induced depression in 50 percent of the mice (ED 50) was calculated. 3-(1-naphthylmethyl)-1,4,5,6-tetrahydro-as-triazine hydrobromide, 3-(2-phenyl-1-methylethyl)-1,4,5,6-tetrahydro-as-triazine hydrochloride and 3-(1,2-diphenylethyl)-1,4,5,6-tetrahydro-as-triazine were found to produce antagonism of reserpine-induced depression at ED 50's of 12, 19 and 10 milligrams per kilogram, respectively.

In other operations, representative compounds of the invention were found to potentiate the symptoms of hyperexcitement and hyperirritability induced in mice by amphetamine. In these operations, groups of ten mice were administered the test compound by intraperitoneal injection at various dosage rates. Thirty minutes later, the mice were administered 5 milligrams per kilogram of d-amphetamine sulfate by intraperitoneal injection. Each group of ten mice was then placed in a wire mesh cage measuring 16 centimeters on a side. The intraperitoneal injection of 20 milligrams per kilogram of amphetamine to mice, followed by aggregation of the mice in small cages results in hyperexcitement, fighting and death of the mice within about five hours. The administration of 5 milligrams of amphetamine per kilogram is not generally fatal under the described conditions. The dosage of representative aralkyl triazines required to produce death in 50 percent of the mice (ED 50) was calculated. 1-methyl-3-phenethyl-1,4,5,6-tetrahydro-as-triazine hydrochloride, 3-(2-phenyl-1-methylethyl)-1,4,5,6-tetrahydro-as-triazine hydrochloride and 1-methyl-3-(1-naphthylmethyl)-1,4,5,6-tetrahydro-as-triazine were found to potentiate amphetamine toxicity with ED 50's of 3.5, 0.2 and 35 milligrams per kilogram, respectively.

The thioimino ester hydrohalide starting materials corresponding to Formula II wherein X represents sulfur can be prepared by the reaction of a substituted nitrile such as 2,3-diphenylpropionitrile, 3-phenyl-2-ethylpropionitrile, 2-(1-naphthyl)acetonitrile or dibenzylacetonitrile with excess hydrogen sulfide in the presence of a mixture of pyridine and triethylamine. In a convenient procedure, the substituted nitrile and the hydrogen sulfide are mixed together with a mixture of pyridine and triethylamine, the pyridinetriethylamine mixture serving also as a reaction medium. The reaction proceeds at temperatures of 0°–25° C. and is generally complete in 1–4 days. The substituted thioamide product is then reacted with an alkyl halide, preferably methyl iodide, in acetone as a reaction medium. The reaction is conveniently carried out at ambient temperatures and is generally complete in one day. The thioimino ester hydrohalide can be separated by filtration or evaporation in vacuo and purified by recrystallization or employed directly in the preparation of the aralkyl triazines of the invention.

The imino ester hydrohalide starting materials corresponding to Formula II wherein X represents oxygen are prepared by the reaction of a substituted nitrile such as 2-phenylpropionitrile, 2-(1-naphthyl)-2-phenylacetonitrile, 2-methyl-3-phenylpropionitrile, 2-(1-naphthyl)-2-methylacetonitrile or 2,3-diphenylpropionitrile with methanol, or preferably ethanol, and an excess of a hydrogen halide such as hydrogen iodide, hydrogen bromide or preferably hydrogen chloride. In a convenient procedure, the substituted nitrile is dissolved in ether, and ethanol and hydrogen chloride are mixed with the solution at a temperature of 0°–25° C. The mixture is held for 1–4 days, after which the ethyl imino ester hydrochloride starting material is separated by filtration or evaporation. The ethyl imino ester hydrochloride can be purified by recrystallization or employed directly to prepare the aralkyl triazines of the invention.

What is claimed is:

1. A member of the group consisting of an aralkyl triazine and the hydrohalide salts thereof, the aralkyl triazine corersponding to the formula

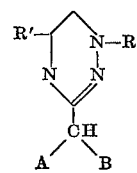

wherein A represents a member of the group consisting of naphthyl and benzyl, B represents a member of the group consisting of hydrogen, methyl, ethyl, phenyl and benzyl and R and R' each independently represent hydrogen or methyl.

2. The compound of claim 1 wherein A represents naphthyl and B represents hydrogen.

3. The compound of claim 1 wherein A represents benzyl and B represents methyl.

4. The compound of claim 1 wherein the compound is 3-(1-naphthylmethyl)-1,4,5,6-tetrahydro-as-triazine.

5. The compound of claim 1 wherein the compound is 3-(1-naphthylmethyl)-1,4,5,6-tetrahydro-as-triazine hydrobromide.

6. The compound of claim 1 wherein the compound is 3-(2-phenyl-1-methylethyl)-1,4,5,6-tetrahydro-as-triazine.

7. The compound of claim 1 wherein the compound is 3-(2-phenyl-1-methylethyl)-1,4,5,6-tetrahydro-as-triazine hydrochloride.

8. The compound of claim 1 wherein the compound is 1-methyl-3-phenethyl-1,4,5,6-tetrahydro-as-triazine.

9. The compound of claim 1 wherein the compound is 1-methyl-3-phenethyl-1,4,5,6-tetrahydro-as-triazine hydrochloride.

10. The compound of claim 1 wherein the compound is 3-(1,2-diphenylethyl)-1,4,5,6-tetrahydro-as-triazine.

References Cited

Trepanier et al., J. Medicinal Chem., vol. 9, pp. 881–5 (1966).

Hahn et al., Roczniki Chem., vol. 38, pp. 557–69 (1964), abstract available through Chemical Abstracts, vol. 61, cols. 10685–6 (1964).

HENRY R. JILES, Primary Examiner

J. M. FORD, Assistant Examiner

U.S. Cl. X.R.

260—453, 999